(12) United States Patent
Pesiridis et al.

(10) Patent No.: US 8,904,784 B2
(45) Date of Patent: Dec. 9, 2014

(54) FLOW CONTROL DEVICE FOR A TURBOCHARGER

(75) Inventors: Apostolos Pesiridis, London (GB);
Ricardo Martinez-Botas, London (GB);
Srithar Rajoo, London (GB);
Harminder Flora, London (GB)

(73) Assignee: Imperial Innovations Limited, London (GB)

( * ) Notice: Subject to any disclaimer, the term of this patent is extended or adjusted under 35 U.S.C. 154(b) by 1689 days.

(21) Appl. No.: 11/720,953

(22) PCT Filed: Dec. 6, 2005

(86) PCT No.: PCT/GB2005/004663
§ 371 (c)(1),
(2), (4) Date: Jul. 13, 2010

(87) PCT Pub. No.: WO2006/061588
PCT Pub. Date: Jun. 15, 2006

(65) Prior Publication Data
US 2011/0072815 A1  Mar. 31, 2011

(30) Foreign Application Priority Data
Dec. 6, 2004 (GB) .................................. 0426733

(51) Int. Cl.
| | |
|---|---|
| F02D 23/00 | (2006.01) |
| F02D 41/14 | (2006.01) |
| F01D 17/14 | (2006.01) |
| F01D 17/16 | (2006.01) |
| F02B 37/12 | (2006.01) |
| F02B 37/22 | (2006.01) |
| F02B 37/24 | (2006.01) |
| F02D 41/00 | (2006.01) |

(52) U.S. Cl.
CPC .......... *F02D 41/1448* (2013.01); *F01D 17/141* (2013.01); *F01D 17/165* (2013.01); *F01D 17/167* (2013.01); *F02B 37/12* (2013.01); *F02B 37/22* (2013.01); *F02B 37/24* (2013.01); *F02D 41/0007* (2013.01); *Y02T 10/144* (2013.01); *F05D 2220/40* (2013.01)
USPC .............................................. 60/602; 60/615

(58) Field of Classification Search
USPC .................................................. 60/602, 615
See application file for complete search history.

(56) References Cited

U.S. PATENT DOCUMENTS 4,477,875 A * 10/1984 Suzuki et al. ................. 701/111
4,492,203 A * 1/1985 Yutaka ......................... 123/478

(Continued)

FOREIGN PATENT DOCUMENTS

| | | |
|---|---|---|
| DE | 10126596 | 12/2001 |
| DE | 10210369 | 9/2003 |

(Continued)

OTHER PUBLICATIONS

International Search Report, PCT/GB2005/004663.

*Primary Examiner* — Thomas Denion
*Assistant Examiner* — Patrick Maines
(74) *Attorney, Agent, or Firm* — Dorsey & Whitney LLP (57) ABSTRACT

A flow control device for a turbocharger (100) includes a flow restrictor (102) with a variable position for variably restricting flow in a turbocharger inlet. A controller (312) controls the position of the flow restrictor based on sensed pressure (300) in the turbocharger inlet (301).

14 Claims, 11 Drawing Sheets

(56) References Cited

U.S. PATENT DOCUMENTS

| | | | |
|---|---|---|---|
| 4,719,757 | A | 1/1988 | Nakazawa et al. |
| 5,025,629 | A | 6/1991 | Woollenweber et al. |
| 6,158,956 | A | 12/2000 | Arnold |
| 7,059,820 | B2 * | 6/2006 | Hosny et al. ............... 415/1 |
| 2004/0050037 | A1 * | 3/2004 | Betta et al. ............... 60/286 |
| 2006/0117750 | A1 * | 6/2006 | Shahed et al. ............ 60/602 |
| 2010/0266390 | A1 * | 10/2010 | Henderson et al. ........ 415/151 |
| 2012/0036849 | A1 * | 2/2012 | Watson et al. ............. 60/611 |

FOREIGN PATENT DOCUMENTS

| | | | | |
|---|---|---|---|---|
| EP | 1471234 | | 10/2004 | |
| JP | 60022024 | A * | 2/1985 | ............ F02B 37/12 |
| JP | 61151041 | | 9/1986 | |
| JP | 07166879 | A | 6/1995 | |
| JP | 07166879 | A * | 6/1995 | ............ F02B 37/00 |
| JP | 2000002120 | A * | 1/2000 | ............ F02B 37/12 |
| JP | 2000002120 | A | 1/2000 | |
| JP | 2002004904 | | 1/2002 | |
| WO | WO 99/53180 | | 10/1999 | |

\* cited by examiner

FLOW CONTROL DEVICE FOR A TURBOCHARGER

The invention relates to a flow control device for a turbocharger.

Turbochargers for gasoline and diesel internal combustion engines are known devices used in the art for pressurising the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurised a desired amount before it is mixed with fuel and combusted within the engine combustion chamber.

The amount by which the intake air is pressurised is controlled by regulating the amount of exhaust gas that is passed through the turbine housing by a wastegate and/or by selectively opening or closing an exhaust gas channel or passage to the turbine running through the turbine housing. Turbochargers that are constructed having such adjustable exhaust gas channels are referred to in industry as variable geometry turbines (VGTs). VGTs typically include a movable member that is positioned within a turbine housing between the exhaust gas source and the turbine. The movable member is actuated from outside of the turbine housing by a suitable actuating mechanism to increase or decrease the volumetric flowrate of exhaust gas to the turbine as called for by the current engine operating conditions which may be, for example, engine speed, engine load, boost (compressor) pressure or differential pressure across the engine. Increasing or decreasing the volumetric flowrate of exhaust gas to the turbine respectively increases or decreases the intake air boost pressure generated by the compressor mounted on the opposite end of the turbine shaft.

One known VGT is described in U.S. Pat. No. 6,158,956.

VGTs can operate with the internal combustion engine when the latter is in either steady state or transient operating mode. This refers to engine operating parameters such as engine rotational speed and load being of constant or changing magnitude respectively.

Accordingly, conventional Variable Geometry Turbochargers (VGTs), on the other hand have become quite popular recently in matching turbine inlet geometry to the characteristics of the exhaust gas stream throughout the engine operating range beyond the selected optimum design point, according to which, fixed geometry turbochargers were designed in the first place. This has led (especially in combination with matched Exhaust Gas Recirculation systems) to a reduction in particle emissions, higher boost especially at the lower speeds, low load conditions, leading therefore to increased available torque and improved acceleration at the lower part of the engine operating envelope. In addition, turbocharger lag performance has improved dramatically.

The problem remains that although VGT's can alter turbocharger geometry according to engine operating conditions they do not take full advantage of the energy available. If more energy was recovered during each exhaust process period, this could raise the amount of energy absorbed by the turbine and therefore the turbocharger could extract more power under the same engine operating conditions.

The invention is set out in the claims. Because movement of the flow restrictor is controlled dependent upon instantaneous engine conditions, improved energy extraction is obtained. Furthermore by provision of a pivoting linkage between a reciprocating actuator and a flow restrictor, fast restrictor response is provided.

In particular, the invention takes into account the pulsating nature of the exhaust gas stream rather than responding to operating point changes only as known in existing VGTs. The operation of such an engine's exhaust valves is such that during the exhaust process large amplitudes of gas mass flow and pressure are observed starting from low values when the valves start to open reaching a peak before the first half of the valve open period with the gas flow dissipating to approximately the same conditions as at the start of the process. This highly pulsating flow is driven directly to the turbine through an exhaust manifold and the turbine housing. The invention adapts turbine geometry at a frequency equivalent to the frequency of the engine exhaust pulses, to ensure that for any given engine condition, the maximum available constant turbine inlet pressure is achieved. As a result the real inlet conditions to the turbo charger including a highly pulsating flow field with a widely varying pressure and mass flow rate level are effectively harnessed.

The ACT provides a more accurate response to a real internal combustion engine, accommodating the periodic nature of its operation with air charge intake and compression, combustion, expansion and exhaust.

Embodiments of the invention will now be described, by way of example, with reference to the drawings, of which:

FIG. 12b shows a side perspective view of adjacent vanes at point E in FIG. 12a, and FIG. 12c shows an upper perspective view of adjacent vanes at point E in FIG. 12a.

In overview the invention provides a movable lightweight flow restricting member is disposed within a turbine housing, between a primary exhaust gas source and the turbine blades. The flow restricting member is axially disposable within the turbine housing. It is attached to a pivoting yoke which in turn attaches to a suitable actuator. Sensors are provided to monitor mass flow rate and pressure levels at the inlet, and to measure the axial position of the flow restricting member. This information is routed to a controller which undertakes to phase nozzle motion in the axial direction with the frequency and amplitude of exhaust pressure levels. As a result there is provided a system and method for providing active control of the pulsating exhaust gas flow at the inlet of a turbocharger turbine for use in internal combustion engines, and in particular taking into account the effect of opening and closing of the engine exhaust valves.

Figure 1A:
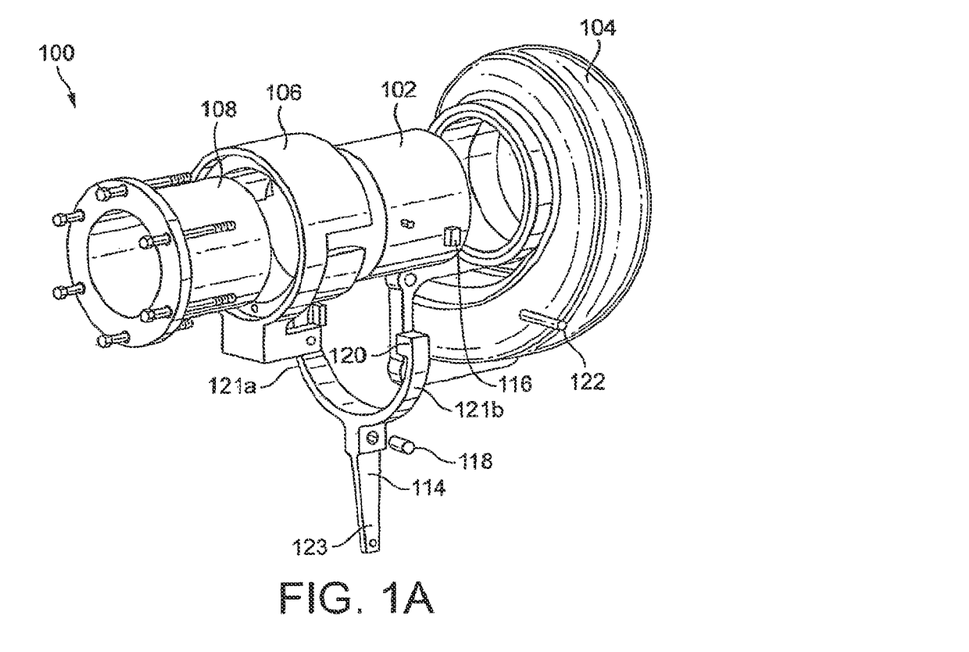
FIG. 1a is an exploded view of an active control turbo charger component.
Figure 1B:
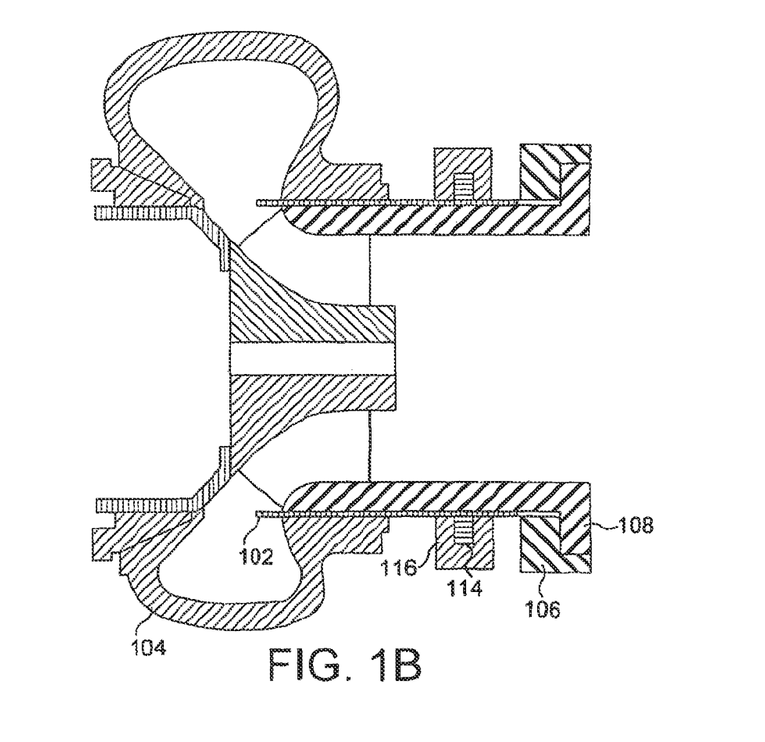
FIG. 1b is a sectional side view of the component.

Referring to FIGS. 1a and 1b the device can be seen in more detail. A turbocharger (100) includes a variably positionable thin (1.5 mm diameter) cylindrical flow restricting member (102) which projects into an opening in the wall of a turbine volute (104). The flow restricting member (102) is oriented such that its longest axis is perpendicular to the direction of gas flow within the volute (104) at the point of insertion. The restricting member (102) is of a suitable length to move parallel to its axis into the volute (104) in order to restrict volute cross section at that point to as little as 17.3% of the cross section available when the flow restricting member (102) is fully retracted.

At any instant, a rear portion of the flow restricting member (102) which is not protruding into the volute (104) is constrained to move between inner and outer cylindrical concentric fixed guides. The outer guide (106) fits around the outside diameter of the flow restricting member (102) with minimum clearance. The inner guide (108) has the same diameter as the inside of the flow restricting member (102) and fits tightly inside it to provide a bearing surface on which the flow restricting member (102) can slide. The inner guide (108) attaches to the wall of the turbine volute (104) and is responsible for holding the entire assembly together.

Towards its outward end, away from the volute (104), the flow restricting member (102) has $1^{st}$ and $2^{nd}$ diametrically opposing outward projections (116) which allow attachment to the receiving arms (121a, 121b) of a yoke (114). The projections (116) fit between the flow restricting member (102) and the yoke (114) and are pivotable to assist in translating the pivoting action of the yoke (114) into a reciprocating linear motion by the flow restricting member (102).

The yoke (114) includes a mounting arm (123) depending downwardly from the semi-circular receiving arms 121a, 121b and pivots about a pivot pin (118) at a point in the region of the junction of the mounting arm and the receiving arm. Below the pivot point the mounting arm (123) extends as a single tapered lever. The mounting arm (123) of the yoke (114) is slightly shorter than the upper semi-circular part to provide a ratio allowing less actuator displacement for any required linear displacement of the flow restricting member (102).

Figure 2:
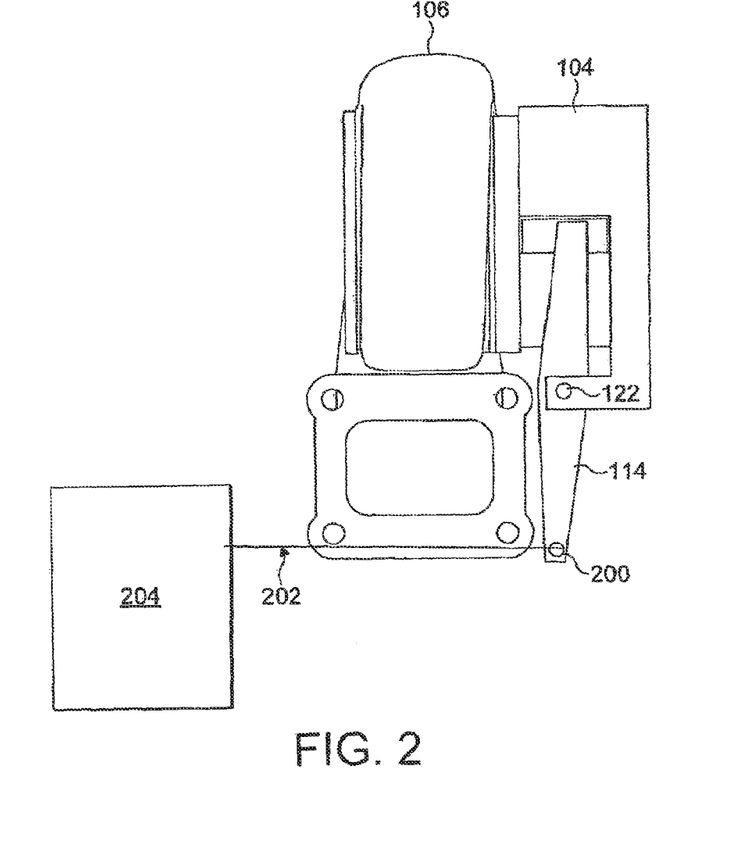
FIG. 2 is a side view of an active control charger and actuator.

As can be seen from FIGS. 1a, 1b and 2, the pivot pin (118) fits through a pivot bearing (122) inserted at the neck of the yoke (114). This bearing (122) serves to attach the yoke (114) to both the volute (104) and the outer guide (106).

Referring now to FIG. 2, the bottom part of the mounting arm of the yoke (114) contains a circular cross section pin (200). The pin (200) is used to mount a lever (202) to connect with the actuator (204). The actuator (204) is an electrodynamic shaker, which provides an oscillatory reciprocating motion, which the yoke (114) translates into a pivoting motion. This in turn is translated into linear motion of the flow restricting member by means of the projection (116) inside the brackets (120) and the axial orientation of the inner guide (108).

To operate the apparatus effectively, an electronic control system is provided as shown in FIG. 3 which shows an open loop control system between an engine (302) and a turbocharger (100), with exhaust conduit (301) therebetween. In addition to the compressor boost pressure transducer (306) featured in standard VGT's, the system contains an instantaneous turbine inlet pressure sensor (300) positioned in the conduit (301) between the engine (302) and the mouth of the turbine volute to the turbocharger (100). The measurements made by the sensor (300) are routed to an ECU (Engine Control Unit) (312). The ECU (312) generates a signal which is sent to the actuator (204) which moves the flow restricting member (102) according to the sensed pressure.

Figure 4A:
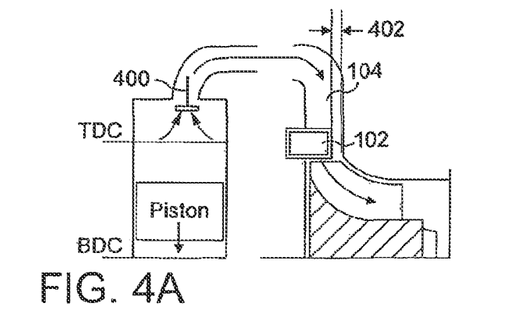
FIG. 4 (a-c) is a depiction of active control flow in operation.
Figure 4B:
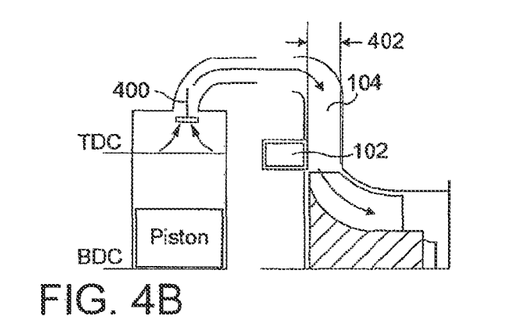
Figure 4C:
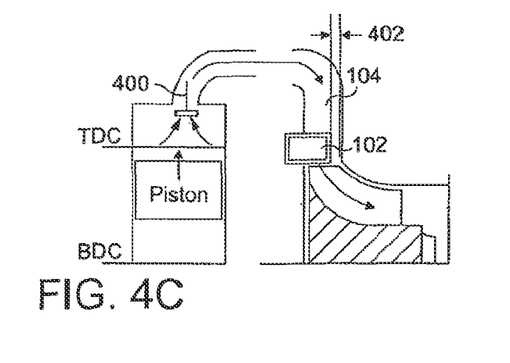

The principle of active flow control is depicted in FIGS. 4a to 4c. FIG. 4a shows the situation just after the exhaust valve (400) has opened and the exhaust gas pressure is low. The flow restricting member (102) moves further into the turbine volute (104). This restricts the cross sectional area (402) through which the exhaust gas can flow, and hence will boost the gas pressure. In FIG. 4b the valve (400) is fully open and exhaust gas pressure is at its peak. The flow restricting member (102) moves back allowing a greater cross sectional area (402) through which the gas can flow. This prevents the already high inlet pressure from exceeding the engine operating limits. In FIG. 4c the exhaust valve (400) is closing so the flow restricting member (406) moves further into the volute (104) to keep pressure levels high. By increasing the inlet pressure, more work is absorbed by the turbine motor and therefore more work is done per each pulse cycle than a conventional VGT.

Figure 5A:
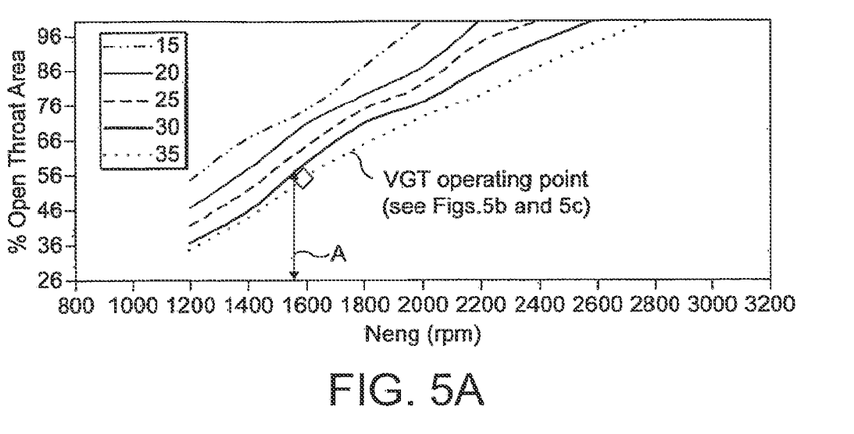
FIG. 5a shows displacement of a VGT flow restrictor (% open throat area) according to engine conditions (Engine speed Neng)
Figure 5B:
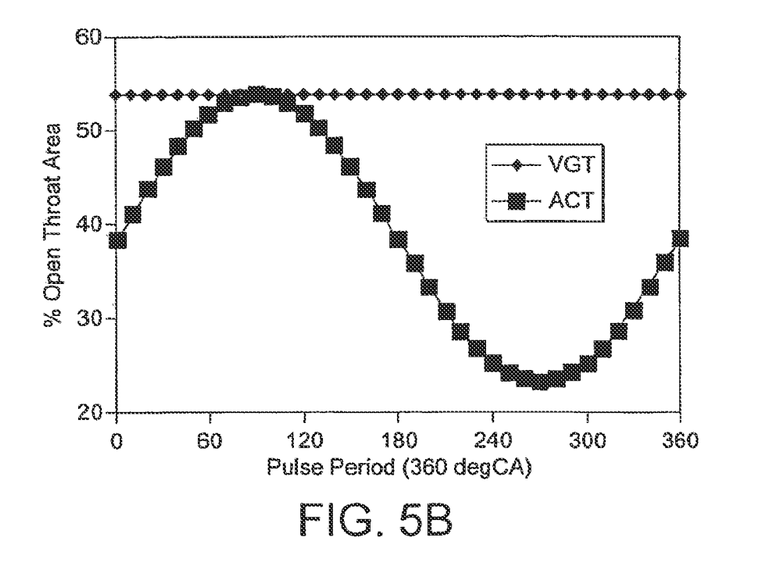
FIG. 5b shows the additional flow restrictor displacement (% open throat area) according to the invention for a given engine condition, against crank angle (CA)
Figure 5C:
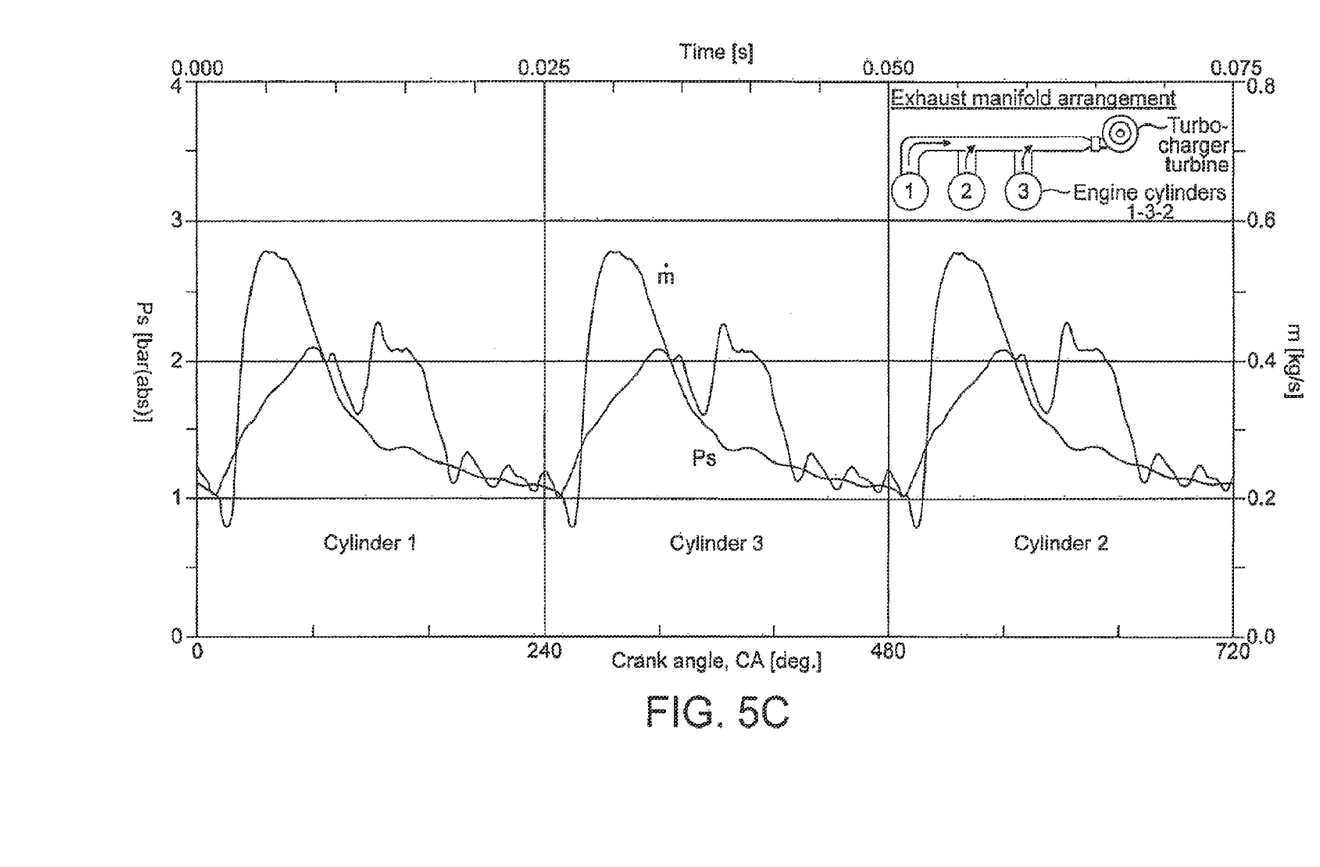
FIG. 5c is a histogram of exhaust gas pressure as a function of crank angle.

FIG. 5c shows the variation of mass flow rate (m) and exhaust gas pressure (Ps) for three cylinders over a drive cycle. The figure displays that within one exhaust valve pulse, the gas pressure at the start of the pulse is approximately equal to that at the end of the pulse, and peaks there between. To track this, the movement of the flow restricting member therefore follows a sinusoidal control input and is itself sinusoidal as a result. Engine operating conditions determine the length of the exhaust valve pulse period and required inlet pressure. Therefore the ECU uses engine operating conditions to determine the amplitude and frequency of the sinusoid being followed at any instant, and to phase it with the exhaust valve pulses. It will be appreciated that any pressure variable, for example caused by any number of cylinder and timing schemes, can be accommodated by the control strategy.

FIG. 5a depicts the displacement of a VGT flow restrictor according to driving conditions. The individual lines depict constant air/fuel ratio (AFR) while each graph corresponds to one compressor exit or engine inlet manifold (boost) pressure, which itself is a measure of engine load. As can be seen, for a given AFR the open throat area of the VGT increases with engine speed (Neng) but is constant for a given engine speed. FIG. 5b shows the corresponding Active Control Turbocharger (ACT) displacement variation according to this invention for a particular point on the VGT graph. It is shown that for a given condition, the maximum ACT displacement corresponds to the equivalent constant VGT displacement. Additional collected information regarding the exhaust gas pressure gives rise to the extra sinusoidal variation of the ACT flow restrictor against crank angle: ie varying with time. This can be seen from arrow A in FIG. 5a, which shows the range of open throat area for ACT at that operating point. Alternatively, the member's movement may adopt control waveforms other than sinusoidal, dependent on the dynamic capacity of the actuator to respond to these inputs; and may vary around the VGT value as a mean, or any other appropriate modulator scheme.

Figure 3A:
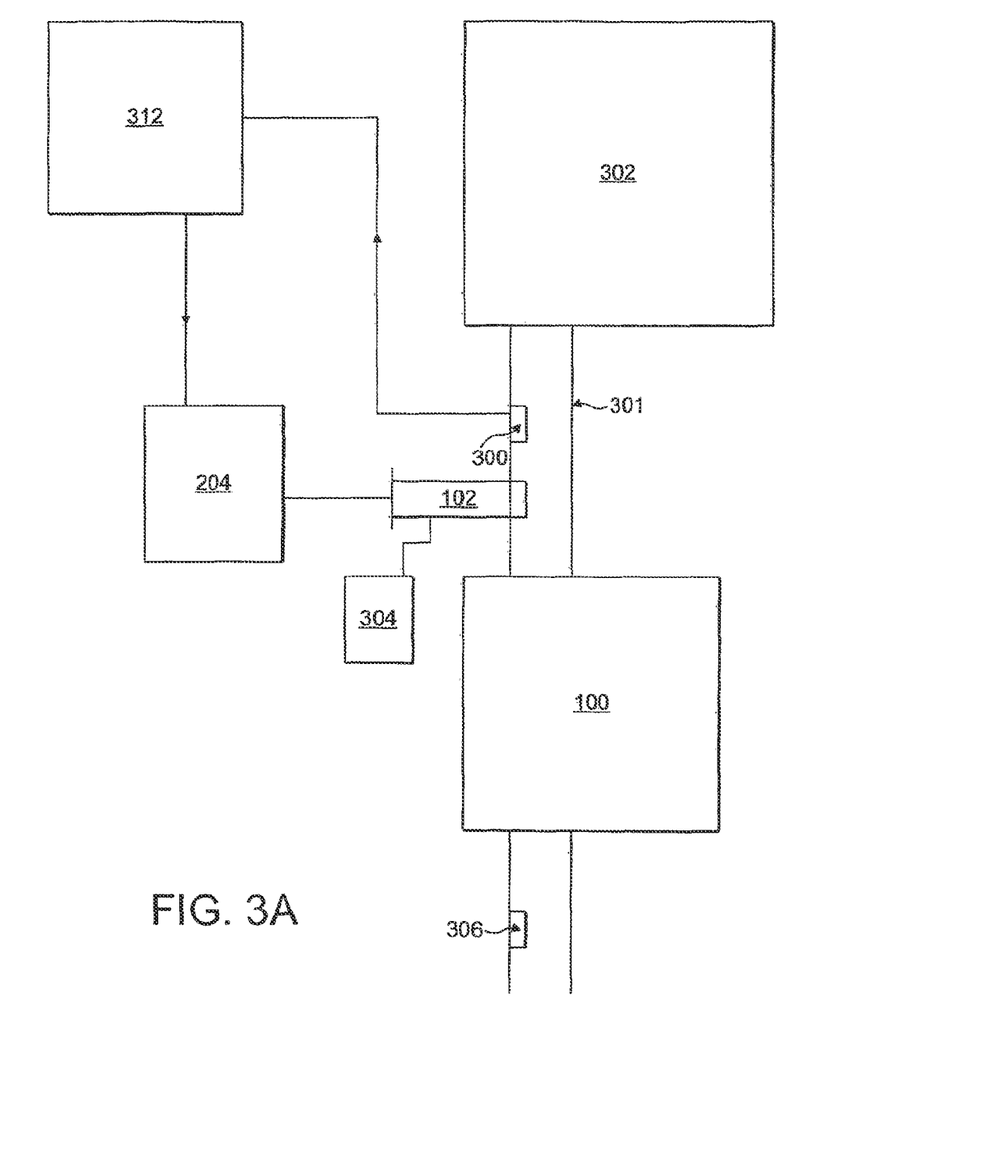
FIG. 3 is a control flow diagram.
Figure 3B:
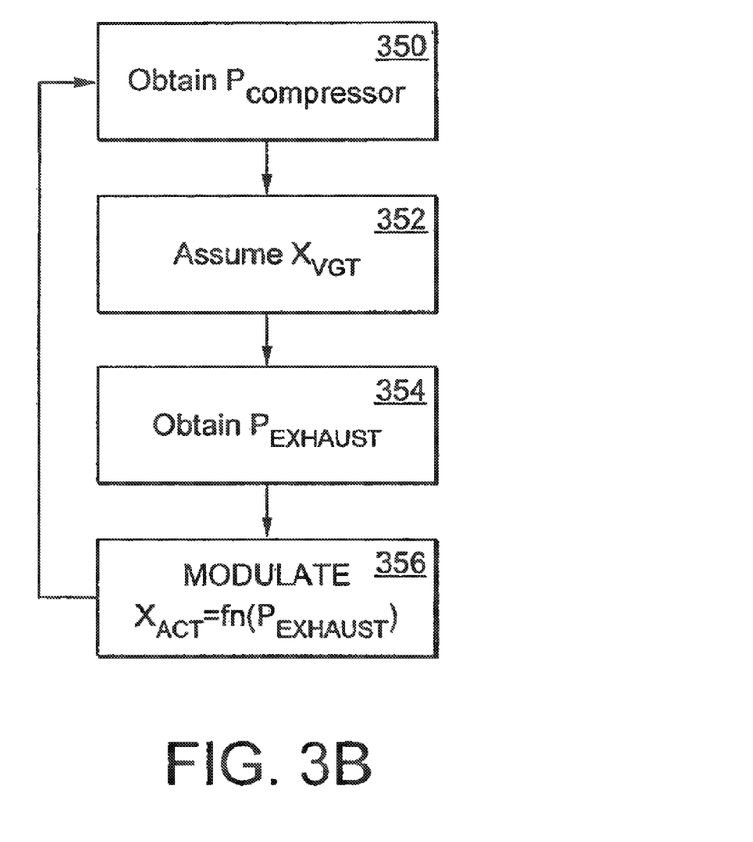

The four basic control steps during operation are shown in FIG. 3b. Step 1 (350) is the same as for a VGT device, where the compressor boost pressure ($P_{compressor}$) is sensed. In step 2 (352), the ACT flow restrictor (102) assumes the position which a VGT restrictor would assume under the given conditions ($x_{vgt}$). Step 3 9354) obtains the instantaneous exhaust gas pressure (pexhaust0 from the measurement of a related variable and in step 4 93560 the flow restrictor position is modulated in relation to $x_{vgt}$ according to $P_{exhaust}$. It will be appreciated that any appropriate control strategy can be adapted.

The flow restricting member may be implemented using any appropriate VGT device, though size, weight and shape requirements make some more suitable than others. Such devices include a sliding wall, sliding annular piston, pivoting vanes and sliding walls with fixed vanes attached. In the pivoting vane arrangement, a series of vanes are arranged around the circumference of the turbine, at the openings where the air stream enters the turbine blades. When the exhaust valves are fully open and the exhaust gas pressure is high, the vanes will be oriented parallel to the air stream, so as not to restrict the openings. At times when exhaust gas pressure is lower, the vanes are pivoted at an acute angle to the air stream, hence restricting the openings to the blades, and increasing gas pressure.

Figure 6:
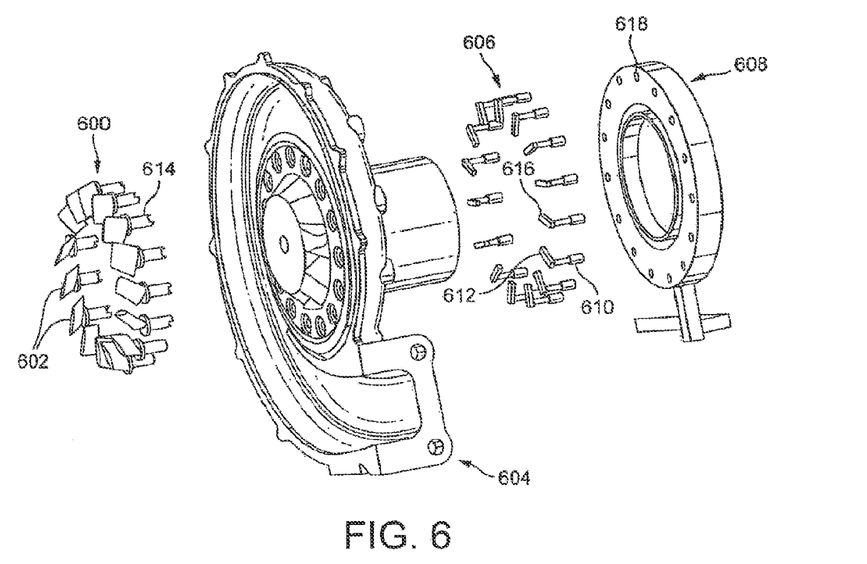
FIG. 6 is an exploded view of a pivoting vane flow restricting member embodiment.

FIGS. 6 to 11b show one possible pivoting vane ACT arrangement. As shown in FIG. 6, a vane ring 600, comprising a plurality of vanes 602, is constructed to fit into a mixed-flow turbine 604 by means of vane pivoting pins 606 and a pivoting mechanism disk 608. Each pivoting pin 606 comprises an axial arm 610 (extending parallel to the axial direction in the turbine) and a radially inward arm 612, the distal end 616 of which is fixed against non-rotational movement. The axial arms 610 are mounted in holes 618 in the pivoting mechanism disk 608. Each vane 602 is affixed to an axial vane arm 614, which is mounted in the distal end 616 of the corresponding radially inward arm 612. When the pivoting mechanism disk 608 is rotated, this causes each pivot pin 606 to rotate on fixed distal end 616. This, in turn, causes the corresponding axial vane arm 614 to rotate about its central axis (parallel to the axial direction in the turbine), causing a change in orientation angle of the vane 602, as is further described below in relation to FIGS. 8, 10 and 12 a to 12c.

Figure 7A:
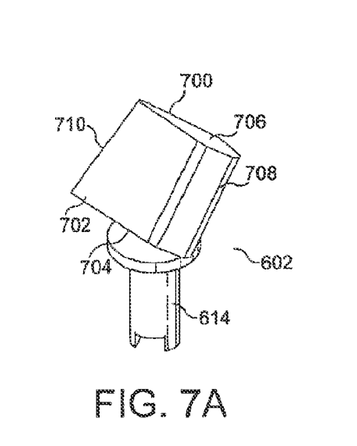
FIG. 7a is a perspective view of a pivoting vane.
Figure 7B:
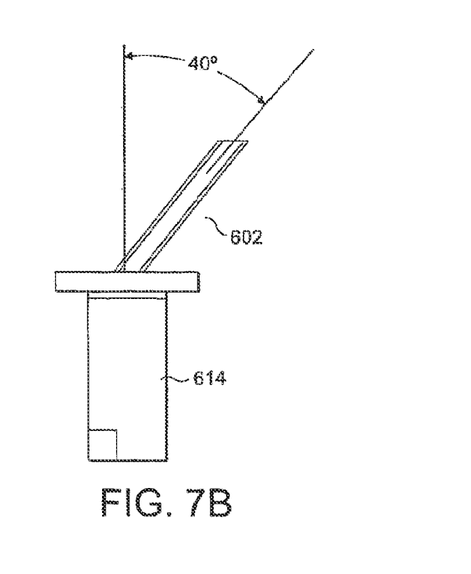
FIG. 7b is a side view of the pivoting vane in FIG. 7a, FIG. 8 is a front view of a pivoting vane ring assembly at a fully open position (40 degrees from radial)
Figure 8:
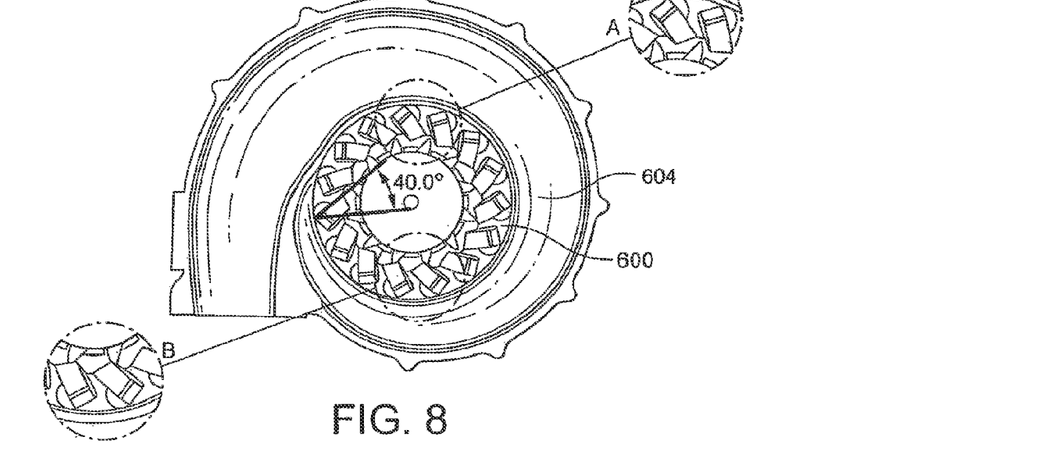
Figure 9A:
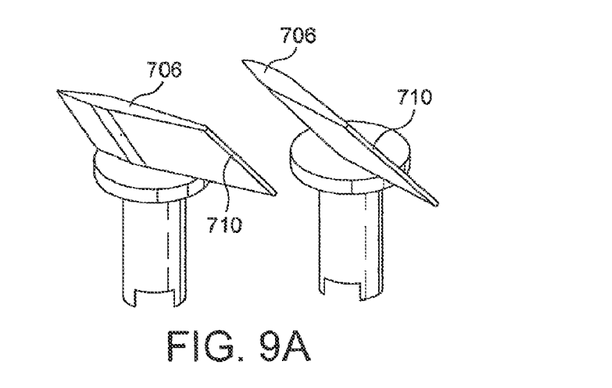
FIG. 9a shows the relative positioning of adjacent vanes at position A in FIG. 8.
Figure 9B:
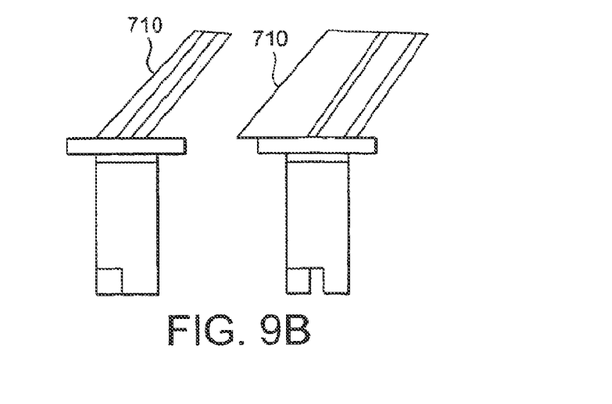
FIG. 9b shows the relative positioning of adjacent vanes at position B in FIG. 8.
Figure 10:
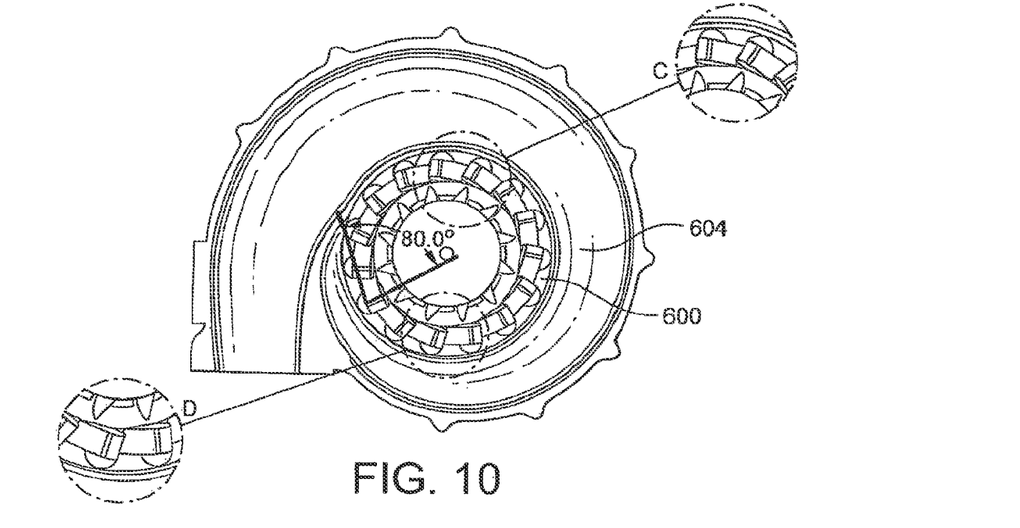
FIG. 10 is a front view of a pivoting vane ring assembly at almost closed position (90 degrees from radial)
Figure 11A:
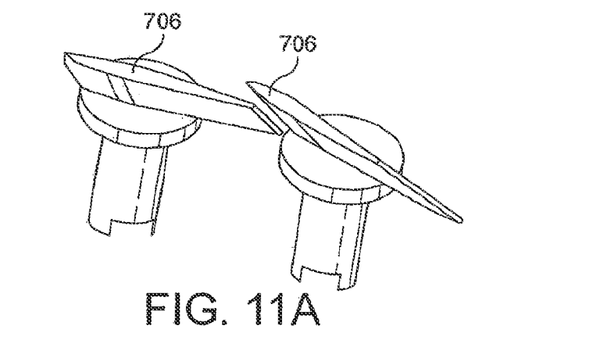
FIG. 11a shows the relative positioning of adjacent vanes at point C in FIG. 10.
Figure 11B:
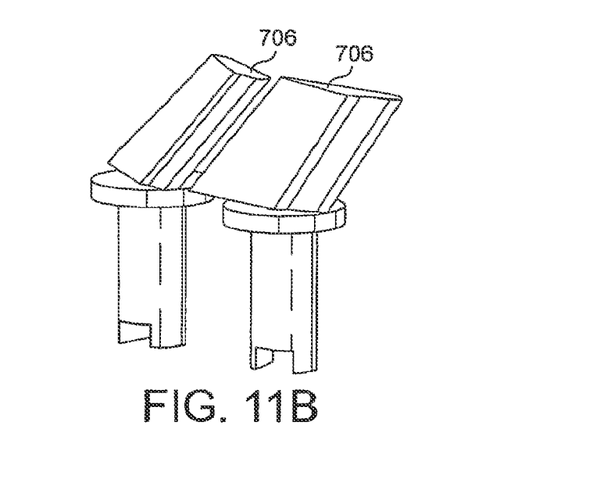
FIG. 11b shows the relative positioning of adjacent vanes at point D in FIG. 10.

As is shown in FIGS. 7a and 7b, each vane consists of an inner airfoil surface 700 facing the mixed flow rotor within the turbine 604 and an outer airfoil surface 702 opposite it. Each vane is constructed straight without camber. Each vane has increasing cross-sectional area span-wise from top (radially innermost) to the bottom (radially outermost), such that the bottom surface 704 area is 16.7% greater than the top surface 706 area. The increase in cross-sectional area is achieved by increasing the chord length of the vane 602, from the fixed leading edge 708, facing inlet airflow. Thus, in span-wise direction, each vane 602 has constant leading edge 708 width, whereas the trailing edge 710 advances further towards the mixed flow rotor, from top 706 to bottom 704. This creates a wedge shaped trailing edge 710 for each vane 602.

According to this embodiment, the vane ring 600 is constructed with 15 vanes 602 placed equally in a 62 millimeter radius circular ring area. As shown in FIGS. 8 to 11b, the vane ring assembly enables the pivoting of the vane ring 600 about an axial direction between a fully open position where the plane of the outer airfoil surface 702 of each vane 602 is at 40 degrees from radial, to almost closed at 80 degrees from radial. Whilst the optimum angle range for the embodiment shown here is 40 degrees to 80 degrees, for any given embodiment the optimum range will depend on input conditions such as the amount of energy fed to the turbine from the engine. In the general case, the turbocharger is at its most efficient when the vanes are angled at between 60 and 70 degrees to radial.

Figure 12A:
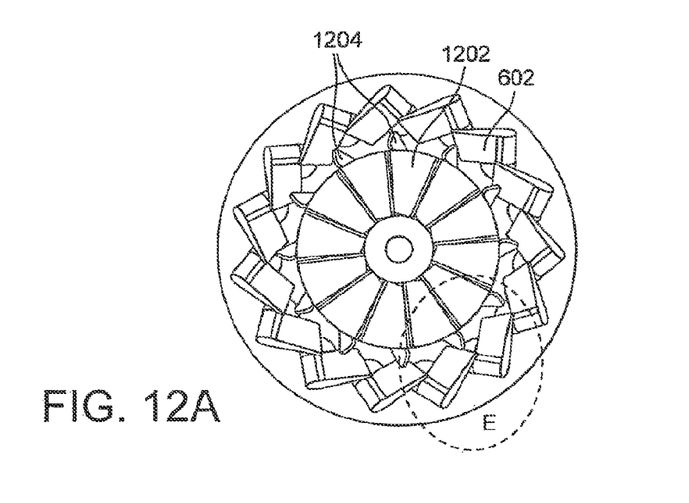
FIG. 12a shows a pivoting vane ring in situ with a mixed flow rotor.
Figure 12B:
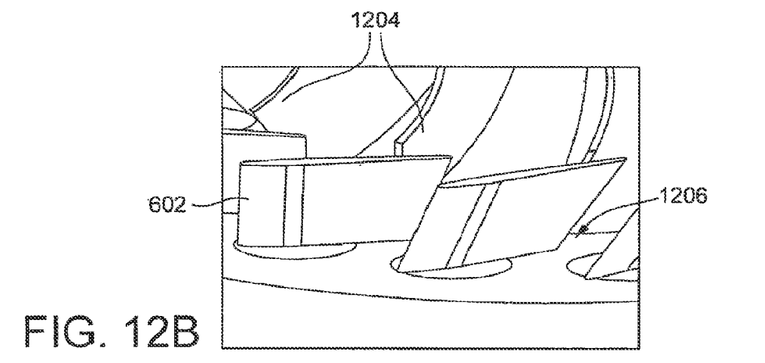
Figure 12C:
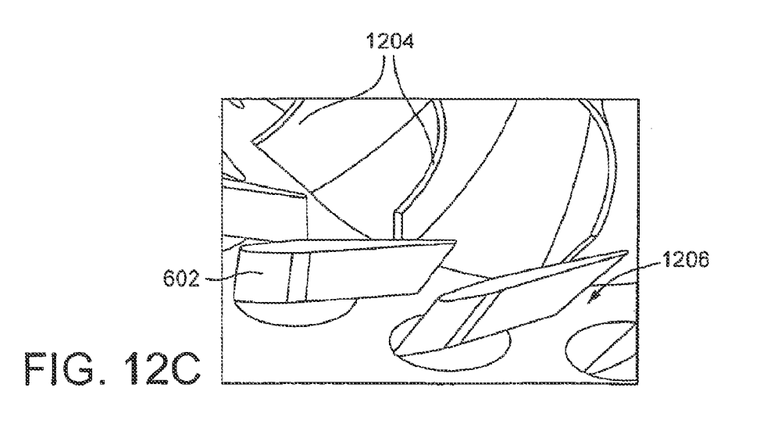

As can be seen in FIGS. 12a to 12c, the vane ring 600 is positioned within the turbine volute, upstream of the mixed flow rotor 1202, such that in order to reach the blades 1204 of the mixed flow rotor 1202, exhaust gas must be channelled through the gaps 1206 between adjacent vanes 602. During an exhaust valve cycle, just after the exhaust valve has opened and the exhaust gas pressure is low, the pivoting mechanism disk 608 will rotate such that the angle to the radial is high and the gaps 1206 through which the exhaust gas can flow are restricted, which will boost the gas pressure. Conversely, when the exhaust valve is fully open and exhaust gas pressure is at its peak, the angle is lower so that the gaps 1206 between adjacent vanes 602 provide a greater cross sectional area through which the gas can flow. This prevents the already high inlet pressure from exceeding the engine operating limits.

Each vane 602 is inclined in order to match the leading edge of the mixed flow rotor 1202. The inclination angle (considered relative to the surface of the turbine volute 604) is equal to the mixed flow rotor's 1202 cone angle. In the embodiment shown in FIG. 7b, the mixed flow rotor's 1202 cone angle is 50°, so the inclination angle is 40°. This ensures that the vane nozzle direction is oriented accurately towards the leading edge of the mixed flow rotor 1202.

It is also possible to retrofit transform a VGT into an ACT by adding an additional flow restrictor or by adding the appropriate control system.

The control system used can be modified in a number of ways; the sensor (300) can be positioned in the conduit (301) between the engine (302) and the mouth of the turbine volute, in the exhaust manifold or in the turbine, and can sense any variable representative of instantaneous turbine inlet pressure, such as mass flow rate. Alternatively, it is possible to actuate the flow restrictor (102) according to the exhaust valve open period, achieved by sending to the ECU the timing signals from different exhaust valve opening and closing based on camshaft rotation. In order to determine the amplitude of the sinusoidal flow restrictor (102) movement, this method still requires either the use of pressure sensor (300) or the calibration of the system before use.

It is also possible to increase the sophistication of the control system by the addition of devices such as a sensor to measure differential pressure across the engine, as well as a LVDT (Linear Variable Differential Transformer) flow restricting member position transducer (304) as shown in FIG. 3a. This allows closed loop feedback control of the ACT. A flow diagram depicting possible control flow is shown in FIG. 3b.

It will be appreciated that the device and components described above can be formed from any appropriate materials and in any appropriate manner. For example the outer guide, inner guide and yoke can be formed from aluminium alloy 6082-T6. The flow restricting member can be constructed from a lightweight material such as carbon fibre reinforced plastic.

The advantage of the invention described over a VGT is that flow area is optimised at all times throughout the driving cycle and steady state pressure within the turbine, for a given engine condition, is approached. This takes advantage of the energy in each gas pulse, resulting in higher mean power extraction from the turbine. The restrictor creates maximum constant pressure at the turbine inlet, which benefits the rotodynamic nature of the turbine. The benefits of operation include improved fuel consumption, higher power output, improved emissions and to a lesser extent improved torque and lag performance. In addition the components are fatigue resistant and lightweight allowing fast response to actuator input in the region of at least 60 Hz for example 20-80 Hz and damping is provided by the pivoting yoke.

Although this description refers mainly to the use of active control flow turbochargers in car engines it is appreciated that the ACT may be used in conjunction with any engine which operates in characteristic cycles.

The invention claimed is:

1. A flow control device for a turbocharger comprising:
   a variably positionable flow restrictor for restricting flow in a turbocharger inlet by an amount dependent on the flow restrictor's position,
   an actuator for varying a flow restriction position of the flow restrictor,
   a sensor for sensing a variable representative of instantaneous turbocharger inlet pressure, and
   a controller configured to receive the sensed variable and generate a control signal including a waveform having a frequency based on the sensed variable,
   wherein the actuator controls the flow restriction position of the flow restrictor at the frequency of the waveform to vary the flow restriction position of the flow restrictor over a pulse period,
   wherein the generated control signal varies as a function of an engine crank angle.

2. A device as claimed in claim 1 in which the variable representative of instantaneous turbocharger inlet pressure is one from a list of instantaneous turbocharger inlet pressure, exhaust gas mass flow rate, exhaust valve open period, valve position, or camshaft rotation angle.

3. A device as claimed in claim 1 in which the flow restrictor is variably positionable to define a flow rate orifice restriction in a direction transverse to the direction of exhaust flow in the turbocharger.

4. A device as claimed in claim 1 further comprising a flow restrictor position sensor for closed loop position control.

5. A device as claimed in claim 1 in which the actuator drives the flow restrictor via a pivoting linkage.

6. A device as claimed in claim 1, in which the actuator drives the flow restrictor via at least one pivoting linkage, and wherein the at least one linkage comprises a linkage arm having a restrictor connection point and an actuator connection point and arranged to pivot around a pivot point intermediate the connection points.

7. A device as claimed in claim 6, in which the linkage arm comprises a yoke.

8. A device as claimed in claim 6, in which linkage arm comprises a pivot pin.

9. A device as claimed in claim 1, in which the flow restrictor comprises a plurality of vanes pivotable between a plurality of flow restrictor positions about an axial direction.

10. A device as claimed in claim 1 in which the waveform is sinusoidal.

11. A device as claimed in claim 10 in which the waveform has an amplitude based on the sensed variable.

12. A device as claimed in claim 10 in which the waveform is phased with an exhaust valve pulse.

13. A turbocharger comprising:
    a flow control device comprising:
    a variably positionable flow restrictor for restricting flow in a turbocharger inlet by an amount dependent on the flow restrictor's position,
    an actuator for varying a flow restriction position of the flow restrictor,
    a sensor for sensing a variable representative of instantaneous turbocharger inlet pressure, and
    a controller configured to receive the sensed variable and generate a control signal including a waveform having a frequency based on the sensed variable,
    wherein the actuator controls the flow restriction position of the flow restrictor at the frequency of the waveform to vary the flow restriction position of the flow restrictor over a pulse period,
    wherein the generated control signal varies as a function of an engine crank angle.

14. A vehicle comprising:
    a turbocharger comprising a flow control device,
    wherein said flow control device comprises:
    a variably positionable flow restrictor for restricting flow in a turbocharger inlet by an amount dependent on the flow restrictor's position,
    an actuator for varying a flow restriction position of the flow restrictor,
    a sensor for sensing a variable representative of instantaneous turbocharger inlet pressure, and
    a controller configured to receive the sensed variable and generate a control signal including a waveform having a frequency based on the sensed variable,
    wherein the actuator controls the flow restriction position of the flow restrictor at the frequency of the waveform to vary the flow restriction position of the flow restrictor over a pulse period,
    wherein the generated control signal varies as a function of an engine crank angle.

* * * * *